United States Patent
Choi et al.

(10) Patent No.: US 6,496,478 B1
(45) Date of Patent: Dec. 17, 2002

(54) METHOD AND APPARATUS FOR CONTROLLING TRAFFIC QUEUES IN NETWORK SWITCHES

(75) Inventors: Kam Choi, Tring (GB); Kevin Jennings, Dublin (IE); Gareth E Allwright, Watford (GB); Christopher Hay, South Harrow (GB); Patrick Gibson, London (GB)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/352,888

(22) Filed: Jul. 14, 1999

(30) Foreign Application Priority Data

Apr. 10, 1999 (GB) ............................................. 9908125

(51) Int. Cl.[7] .................................................. H04J 1/16
(52) U.S. Cl. ...................... 370/229; 370/413; 370/429
(58) Field of Search ................................. 370/413–419, 370/231, 236, 395.1–395.43, 232, 229, 412, 233–240, 428, 429; 710/29, 54

(56) References Cited

U.S. PATENT DOCUMENTS

| | | | | |
|---|---|---|---|---|
| 6,377,547 B1 | * | 4/2000 | Levy et al. ................. | 370/231 |
| 6,151,301 A | * | 11/2000 | Holden ........................ | 370/232 |
| 6,333,917 B1 | * | 12/2001 | Lyon et al. ................. | 370/236 |

FOREIGN PATENT DOCUMENTS

| | | |
|---|---|---|
| EP | 0877534 A2 | 11/1998 |
| GB | 2331676 A | 5/1999 |

* cited by examiner

Primary Examiner—Hassan Kizou
Assistant Examiner—John Pezzlo
(74) Attorney, Agent, or Firm—Nixon & Vanderhye P.C.

(57) ABSTRACT

A network switch includes a transmit queue of packets along with indication (e.g. in respective status words) of the type of each packet and its size. An arbitrator includes a counter which is incremented by the size (e.g. in bytes) of each packet of a first type (e.g. 'low-loss') and decremented by a scaled size of each packet of a second type (e.g. 'normal loss'). If the queue exceeds a set limit, preferably less than the maximum possible size of the queue, packets are discarded if a scaled packet of the second type exceeds the net content of the counter.

5 Claims, 2 Drawing Sheets

METHOD AND APPARATUS FOR CONTROLLING TRAFFIC QUEUES IN NETWORK SWITCHES

FIELD OF THE INVENTION

This invention relates to packet-based data communication networks such as for example Ethernet networks and more particularly relates to the organisation and management of traffic queues in network switches.

BACKGROUND OF THE INVENTION

It is customary, and in most circumstance a practical necessity, for network switches, that is to say devices having a multiplicity of ports for receiving data packets and arranged to forward data packets from one or more ports, to provide some temporary storage of packets in a queue for each "transmitting" port. It should be understood that switches commonly have ports which are capable of duplex operation and the term "transmitting port" is intended to refer to the transmit function of a port which is capable of duplex operation.

It is desirable for a variety of reasons to sort traffic data into different types, that is to say high priority and low priority or normal loss and low loss packets. It is inevitable in a practical system that a network or part of it may become congested and in order to relieve that congestion it may be necessary to discard packets rather than to store and forward them normally. The criteria for discard may vary according to the sorting which is desired. For example, network switches may be remote or internally controlled by means of special packets known as "management frames" which may normally be given a high priority, and thereby immunity against discard. Alternatively, certain packets (for example those defining video data) must be transmitted with a minimum or constant latency. As a practical matter it is better to discard such packets rather than to transmit them with excessive delay, since many television systems are capable of reconstituting (by extrapolation or interpolation) missing video data whereas cannot properly handle data which is received out of proper synchronism.

It is in theory possible to provide for each transmitting port of a switch a multiplicity of queues of packets sorted according to traffic type, but such an expedient has a disadvantage of adding more memory in respect of each port. Such a solution is particularly undesirable where traffic queues are implemented within an ASIC (application specific integrated circuit) rather than external memory. Furthermore, adding memory to a port does not scale easily if there are for example four queues per port.

SUMMARY OF THE INVENTION

The basis of the present invention is to employ for at least one port, and optionally in respect of a multiplicity of ports, a FIFO queue which can support at least two categories of traffic sorted according to traffic type, such as low and normal loss. The terms 'low loss' and 'normal loss' are used herein to denote packets of which 'normal loss' packets should be discarded in preference to low loss packets. The invention further contemplates use of a threshold or "watermark" and a packet ratio counter which counts the ratio of the aggregate sizes of the respective traffic types, for example in bytes. Thus the FIFO queue can accept both low and normal loss packets up to the threshold or watermark, which is preferably programmable. Accordingly, in an uncongested system, no packet will be lost.

Once the length of FIFO queue exceeds the threshold, the system enables a decision to be made whether to accept or discard a packet. A counter (or a set of counters) may be used to form a net aggregate of the accumulated traffic flow of one type and a scaled traffic flow of the other type, the scaling being made in accordance with the desired ratio. The counter may be incremented by the size of every accepted packet of one type and decremented by a scaled packet size of another type. The net aggregate is used to make a decision whether to accept or discard a packet of said other type. In particular, a scaled packet may be compared with said net aggregate and be discarded or transmitted according as the scaled packet size is greater than said net aggregate or not.

These and further features of the invention will be more apparent from the following description by way of example and with reference to the accompanying drawings.

DETAILED DESCRIPTION OF A PREFERRED EMBODIMENT

Figure 1:
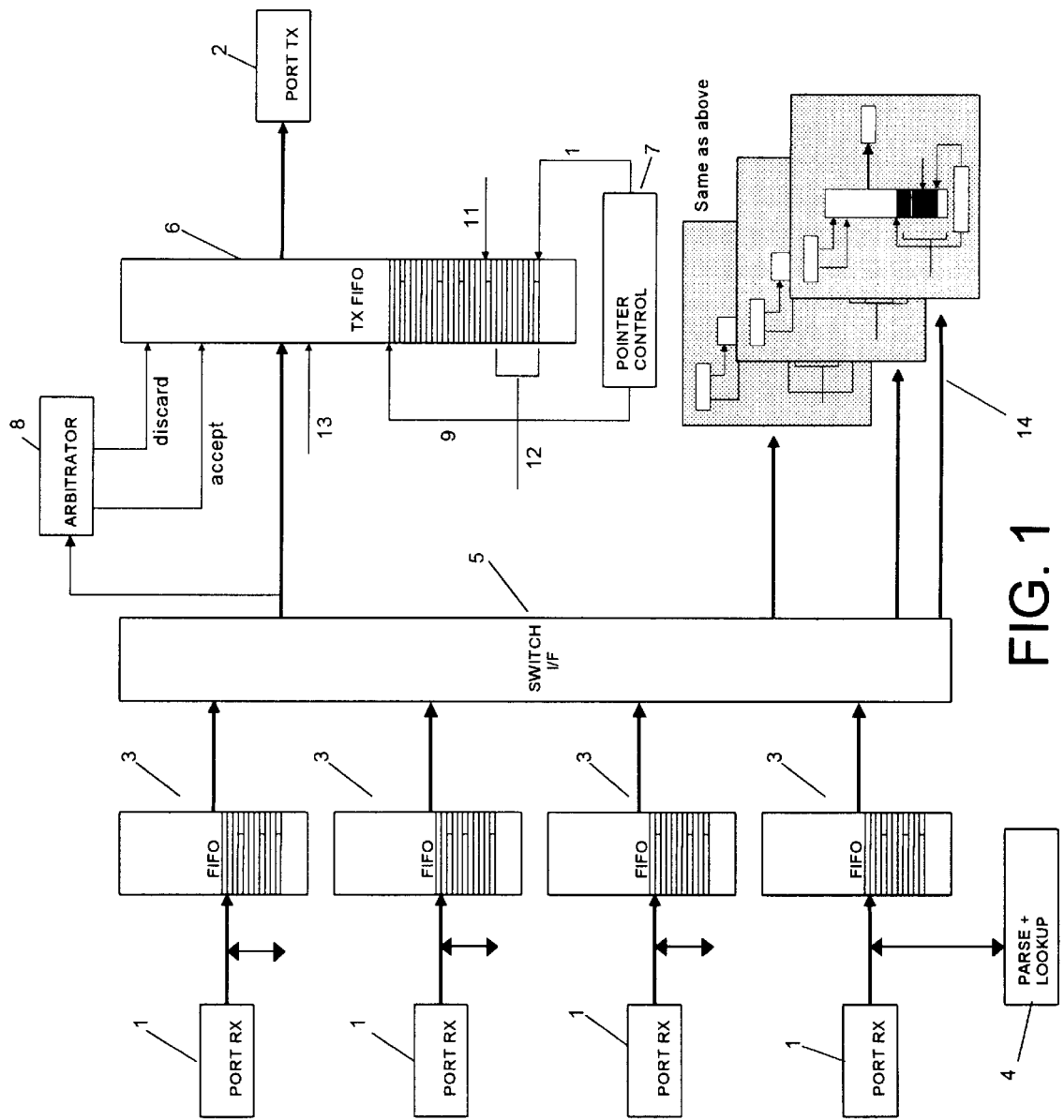
FIG. 1 illustrates a network switch including an arbitration scheme according to the invention.

FIG. 1 of the drawings shows in a simplified and schematic form the main elements of a network switch which, with the exception of the arbitration means and its interrelation with the FIFO queue that it controls, is in a generally known form. The invention is not intended to be limited to the particular arrangement of switches set forth in FIG. 1.

The illustrated switch comprises a plurality of ports, which for convenience of illustration have been separated into receiving ports 1 and transmitting ports 2. It will be understood that normally each physical port on the switch is capable of duplex working and therefore may be constituted by a receive port 1 and a respective transmit port 2.

Packets received at the receive ports 1 may be temporarily stored in FIFOs 3 while the headers of the relevant packets are stripped and examined in the customary way by parse and look-up functions 4 to determine, for example, from an examination of the destination address in conjunction with a look up table which of the ports (or multiplicity of ports) the respective packets should be forwarded. The packet will be provided with a bit mask that defines the transmit ports 2 from which it should be forwarded. It may be necessary in the case of a multi-cast transmission to forward the packet from more than one of the transmit ports and in the case of a packet of which the destination address is not already present in a look up table, it may be necessary to transmit the packet from all or at least a plurality of the ports in order to resolve the addressing of the packet by means of an acknowledgement signal from the destination for which it is intended. It is common in switches of this nature to perform a look up on the source address of the packet and to make an entry in the look up table if the source address does not already exist in order to establish an entry which identifies a particular port with the source address. As is well known, look ups may generally be performed on media access control addresses, as normally where the switch is acting as a bridge, or on layer 3 or network addresses, wherein the switch is normally acting as a router. However, network switches capable of both functions are known.

In addition to source and destination address look ups, the parse and look-up functions 4 will also examine the header portion of the packet in order to obtain an indication of packet type. There is a variety of ways of determining type for the purpose of the present invention. Packets customarily include fields which enable type to be defined. Nevertheless type can be determined from an examination of address data; for example by determining whether the source or destination is a multi-media source. Designation of the type of each packet is established by allotting the packet a latency mask, typically a three-bit mask. The port mask and the latency mask will be transmitted with the packet across the switch and form part of the status word which is stored with the relevant packet Packets are read out from the receive FIFOs 3 by means of an interface 5; encapsulated with the relevant masks determined by the parse and look-up functions 4 and read into a respective transmit FIFO buffer 6 for a port 2.

The FIFO buffer 6 may, particularly if the switch is incorporated on a single chip, be defined in static random access memory and be allotted a predetermined space in that memory, writing into the memory space and reading from it being controlled by a known form of pointer control 7. Before the action of this is described, it is convenient to mention that packets read out from the FIFO store may be passed to the respective 'transmitting' port 2. Whether a packet is allowed to proceed to the buffer 6 from the interface 5 to or is to be discarded is determined by an arbitrator 9 which will be more particularly described with reference to FIG. 2. Where the packets are discarded is not fundamental to the invention although it is convenient to perform any discard before the respective traffic queue.

The pointer control 7 controls a write pointer 10 and a read pointer 11. These proceed around the FIFO space so that each new packet is written at the space identified by the pointer 10 and each packet is read out in its turn from the space indicated by pointer 11.

When the pointer 10 reaches the "end" of the memory space it recycles through the memory space if it is possible to do so. If the pointer 10 catches up with the pointer 11 the memory space is physically full whereas if the read pointer 11 catches up with the write pointer 10 the memory space is empty.

Typically, the FIFO memory space may have room for a few, such as three, maximum sized packets. Each packet 12 is stored in the memory space in a conventional manner, comprising a status word 12 followed by the packet data. The status word may, apart from conventional groups indicating the start and end of the status word, include the size of the packet, the port mask and the latency mask.

In known forms of switch, the size of packet is employed to determine the extent of reading in each read out cycle, it being understood that the read out will commence at the memory space identified by the read pointer and proceed for the size of the packet as indicated in the respective status word. The bit mask is employed by the interface 5 to determine from which port or ports the packet should be forwarded.

A threshold or watermark 13 can be defined in the FIFO queue by a variety of different means. In the present example, the threshold or watermark may simply be defined by a number of memory spaces between the write and read pointers. It is possible though undesirable for the threshold to correspond to absolute fullness of the FIFO. It is generally preferable for the threshold to be defined to allow some space for bursty traffic.

Each of the 'transmit' ports 2 is associated with a respective buffer and respective arbitrator: these are all generally indicated by the reference 14.

The operation of the arbitrator 8 will be described on the assumption that the latency mark defines two categories of traffic, specifically low-loss traffic and normal loss traffic. It will also be assumed that the user wishes to regulate the low-loss and normal loss packet in the ratio of 2:1 in terms of byte size (i.e. the aggregate flow measured in bytes of low-loss packets should be twice that of normal loss packets). It is preferable to implement the arbitrator in hardware to enable operation at 'wire speed'.

The arbitration scheme is based on allowing transmission of packets of both normal loss and low loss from ports 2 until the FIFO queue 6 exceeds a level denoted by the line 14 to and represented by a certain fraction of the absolute fullness of the memory space in the FIFO queue. Thus in an uncongested system, no packet will be discarded.

Figure 2:
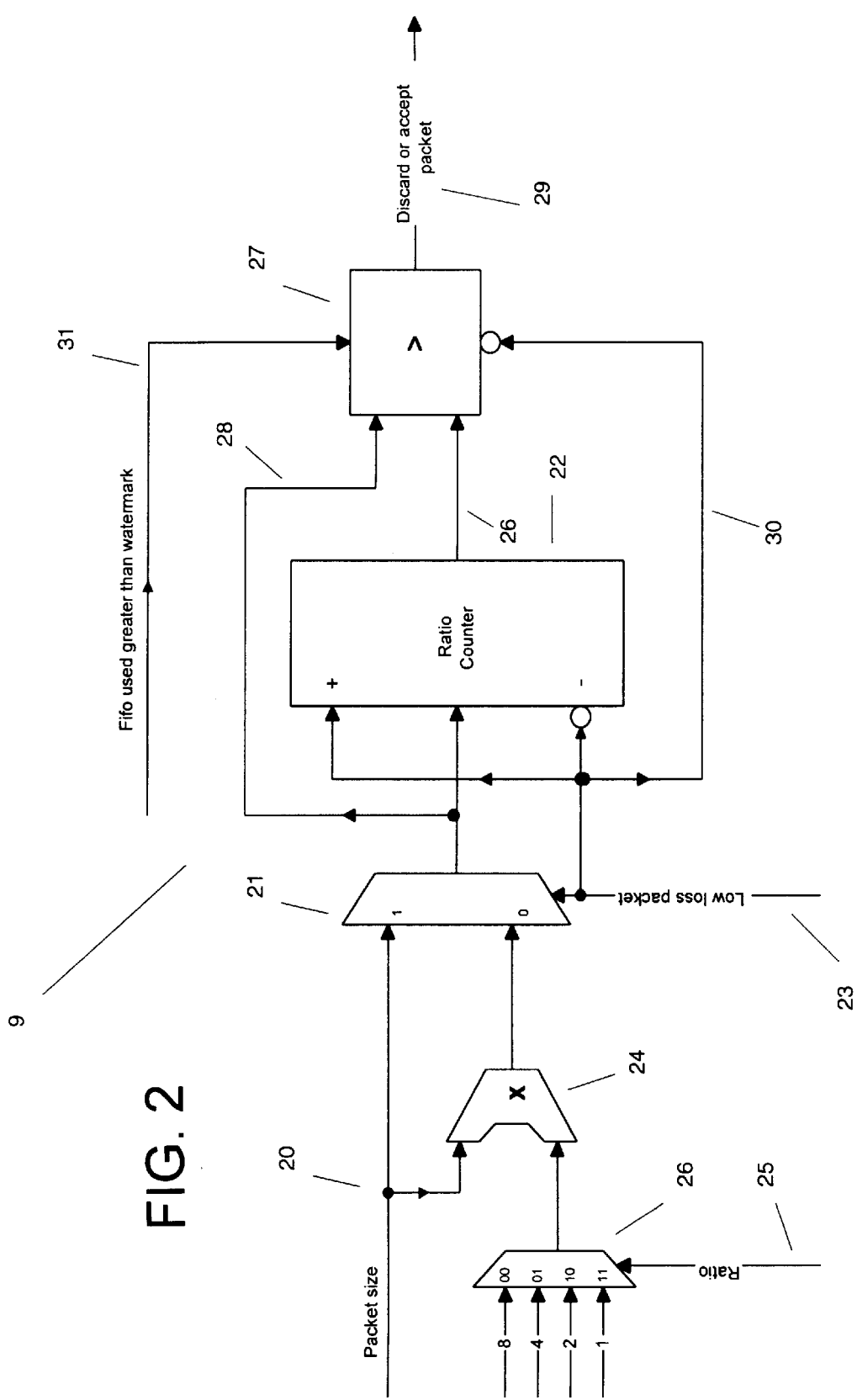
FIG. 2 is a schematic diagram of a preferred form of arbitration device in accordance with the invention.

FIG. 2 illustrates one embodiment of the arbitrator 8. Words denoting packet size are received from switch interface 5 on a line (or group of lines) 20 to one input of a multiplexer 21. Multiplexer 21 transmits the word denoting the size of the packet to a counter 22 unless the multiplexer receives on line 23 a signal (0) denoting a normal loss packet, in which case the multiplexer 21 transmits to ratio counter 22 the product of the packet size and a multiplying factor. A multiplier 24 receives the packet size at one input and receives a scaling factor at another input. The scaling factor is (in this embodiment) either 1, 2, 4 or 8, selected by a two bit address word input 25 to a multiplexer 26 which provides the selected scaling factor to the multiplier 24. The ratio selected by means of line 25 may be locally or remotely controlled.

If the signal on line 23 is '1' (denoting a low-loss packet), the increment input (+) of counter 22 is enable whereas if the signal on line 23 is '0' (denoting a normal loss packet) the decrement input (-) of the ratio counter is enabled.

The counter 22 (in this example) counts for every low-loss packet an increment equal to the packet size. If however the packet is a normal loss packet, the scaled packet size decrements by the scaled packet size. If the ratio of low-loss to normal loss packets (in byte count) is to be 2:1 then the normal loss packet sizes are scaled by a factor of 2. The counter 22 forms the difference between net aggregate of low-loss packets and scaled normal loss packets and at any time the net count in the counter can be used to decide whether to transmit or discard a normal loss packet. Although several different schemes could be employed (such as comparing the net count with a datum) the present embodiment, if a current packet is a normal loss packet, compares the scaled packet size with the net count in the counter. For this purpose the net count is provided by counter on line 26 to one input of a comparator 27 which receives on another input line 28 the output of multiplexer 21. This output will be a scaled output if the packet is a normal loss packet. In order to produce on an output a line 29 a signal indicating whether to discard the packet or not, the comparator requires a signal on line 30 indicating that the packet is not a low-loss packet and an enabling signal on line 31 indicating that the 'watermark' has been exceeded. Then comparator 27 produces a discard signal on line 29 if the scaled packet size exceeds the net count of counter 27.

Modifications of the system described are of course possible. In particular the method can be extended to support more than two traffic types. For every additional traffic type, one may add another watermark, packet ratio counter and comparator. For example if the ratio of normal loss and high loss packets is to be controlled also, a second counter may be incremented with the packet size of every normal-loss packet which is allowed to pass and decremented with a scaled packet size for every high loss packet. Combinatorial logic may be used to resolve the outputs of the comparators.

What is claimed is:

1. A network switch for receiving and forwarding data packets and including:

ports for receiving and forwarding data packets means for establishing a queue of data packets received at at least one of said ports and intended for forwarding from at least one of said ports, said queue including in respect of each packet a first indication denoting a type of the packet and a second indication denoting a size of the packet;

counting means for forming a net aggregate augmented by packet sizes of packets of one type and diminished by packet sizes of packets of a second type scaled by a selected scaling factor;

means for determining whether the said queue is greater or less than a threshold; and means operative when said queue is greater than the threshold to respond to the net aggregate to determine whether to discard a packet of said second type.

2. A network switch according to claim 1 wherein the means responsive to said net aggregate comprises a comparator for comparing the net aggregate with a scaled packet size and to produce a signal denoting discard of a packet if the packet is of the second type.

3. A network switch according to claim 1 wherein said means for computing comprises a counter which is incremented in accordance with a packet size when a packet of said queue has said first type and is decremented in accordance with a packet size scaled by said scaling factor when a packet of said queue has said second type.

4. A network switch according to claim 3 and including means for multiplying a packet's size by said scaling factor to provide a scaled packet size, and a multiplexer controlled by an indication of packet type to select for said counter between the packet size and the scaled packet size.

5. A network switch according to claim 2 wherein said means for computing comprises a counter which is incremented in accordance with a packet size when a packet of said queue has said first type and is decremented in accordance with a packet size scaled by said scaling factor when a packet of said queue has said second type.

* * * * *